April 16, 1963

T. R. THOMAS 3,085,653

LUBRICATION SYSTEM

Filed July 27, 1959

INVENTOR
THOMAS R. THOMAS.
BY
Dean Fairbank & Hirsch
ATTORNEY

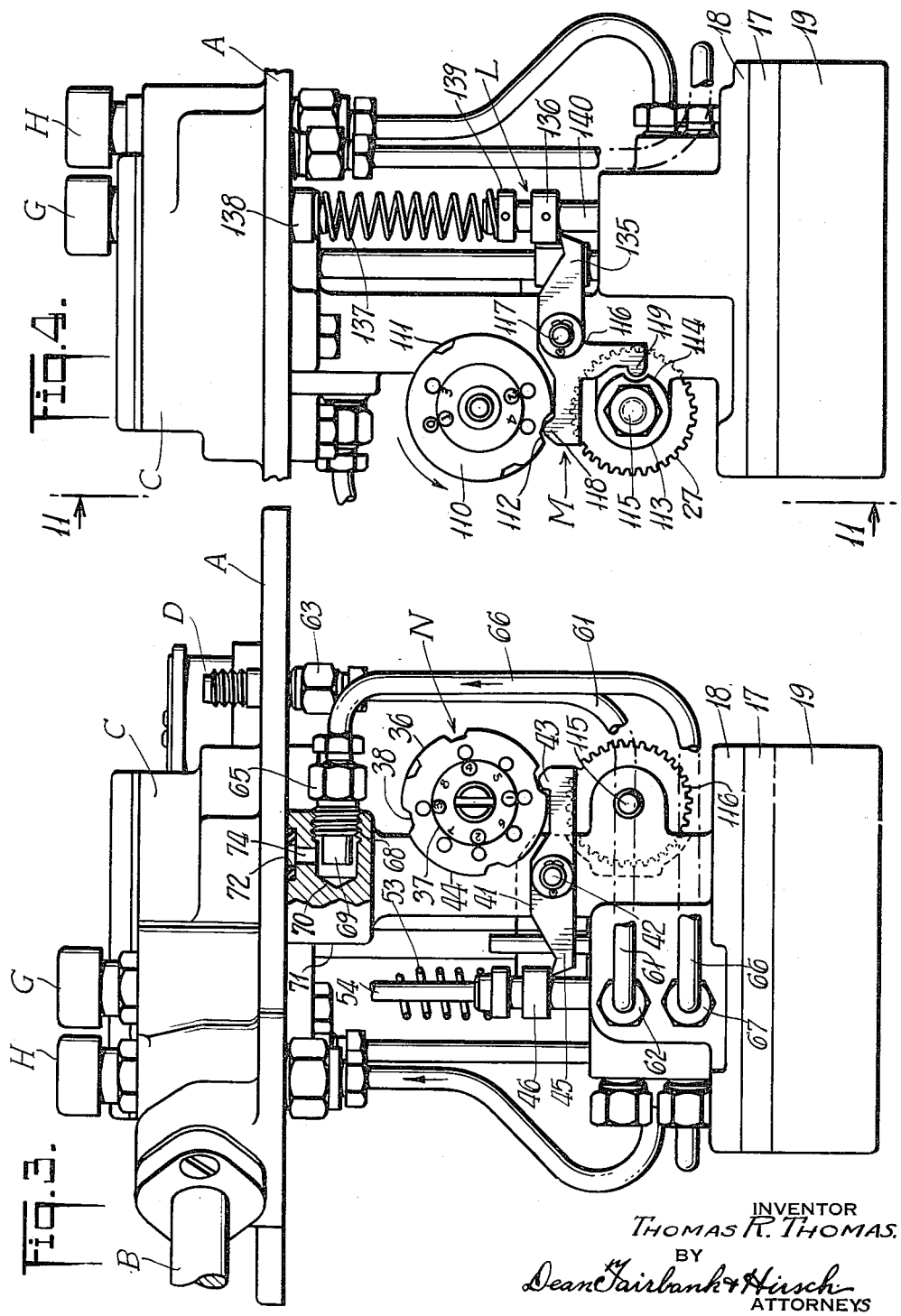

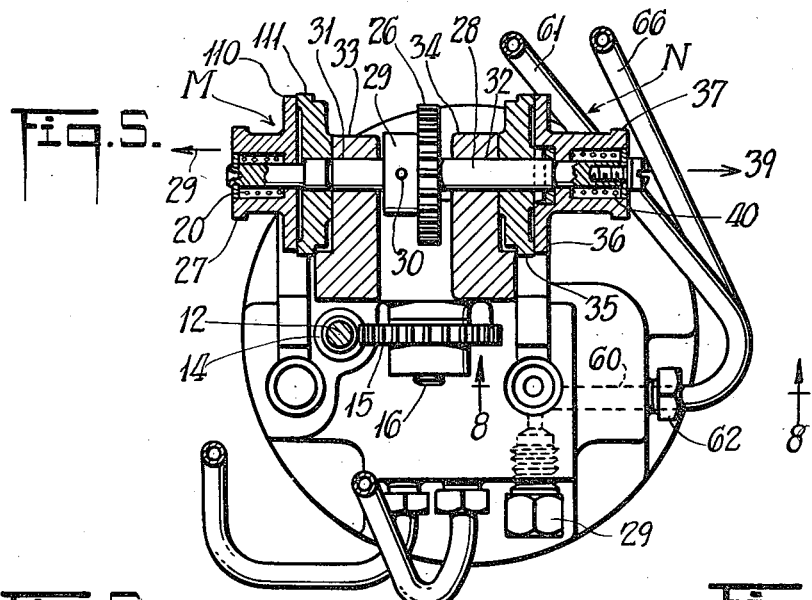
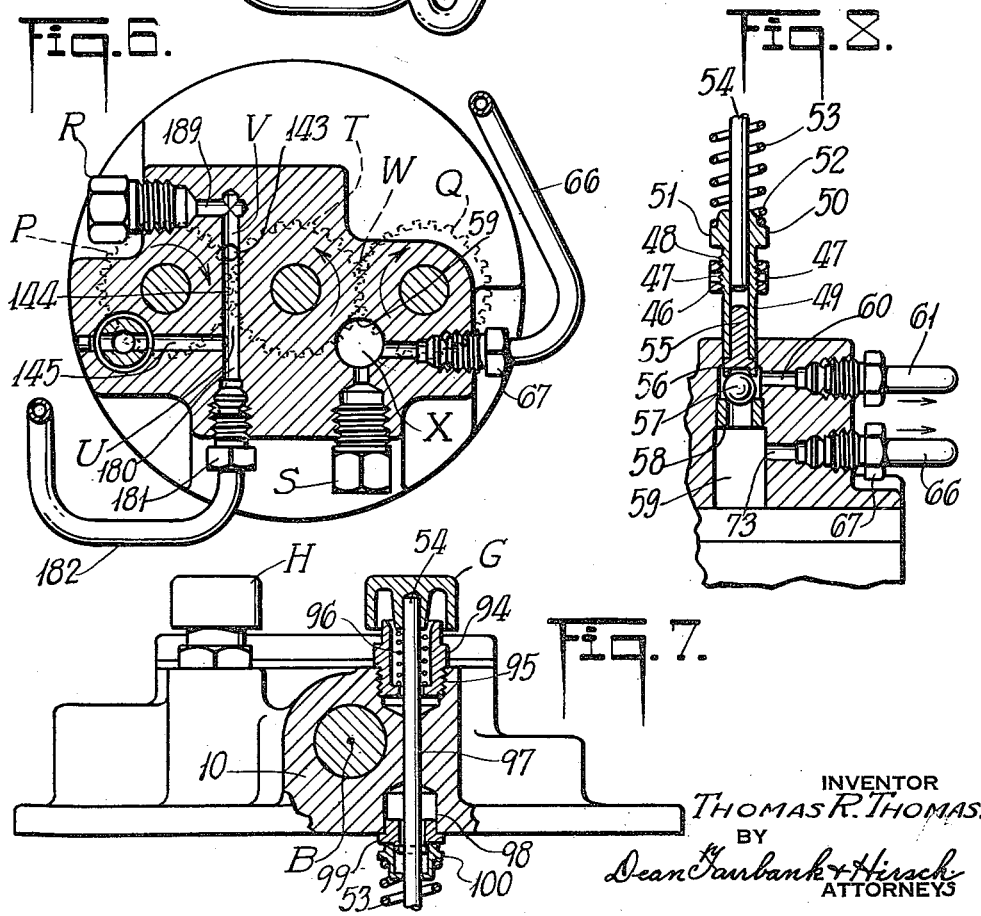

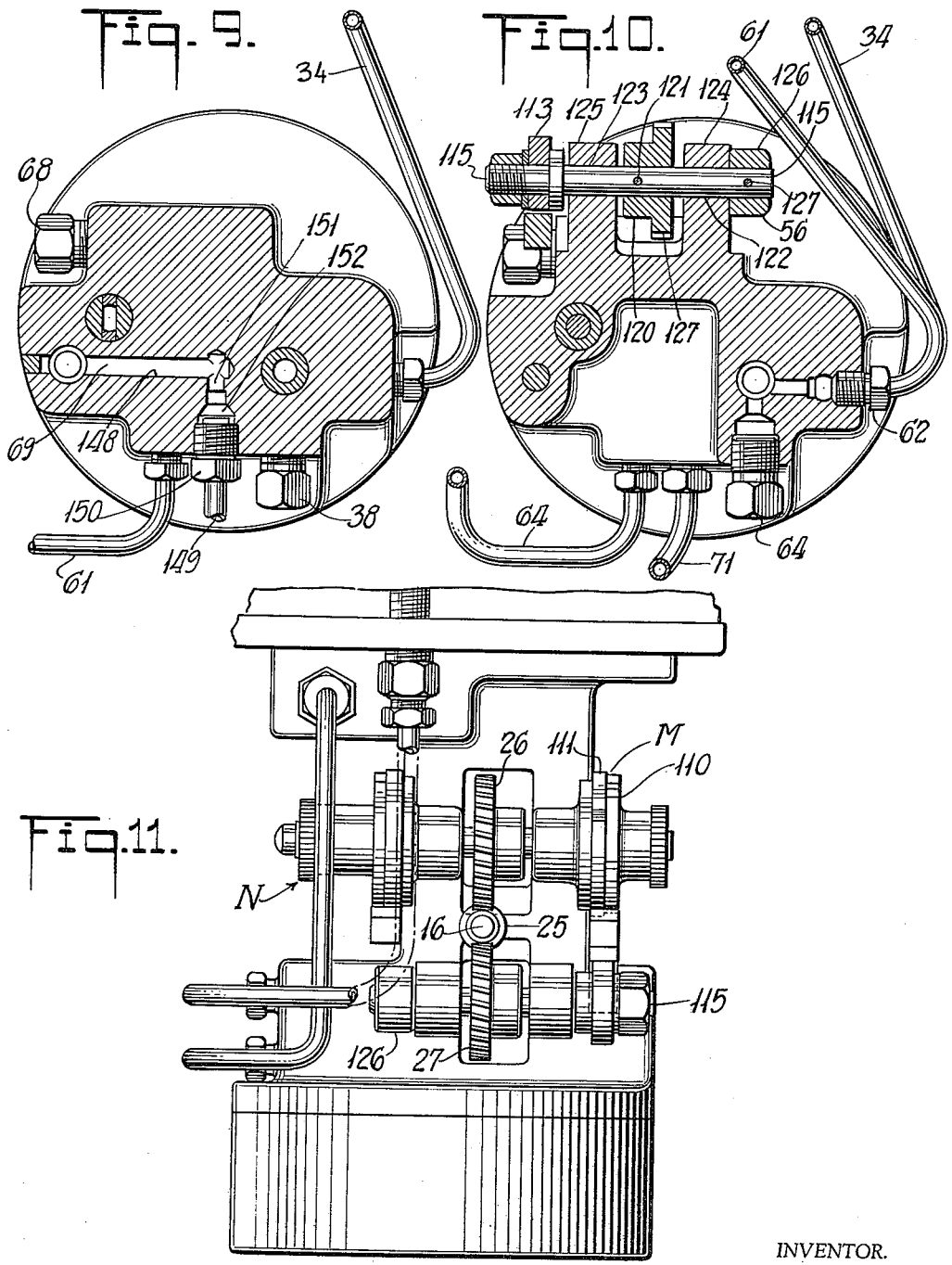

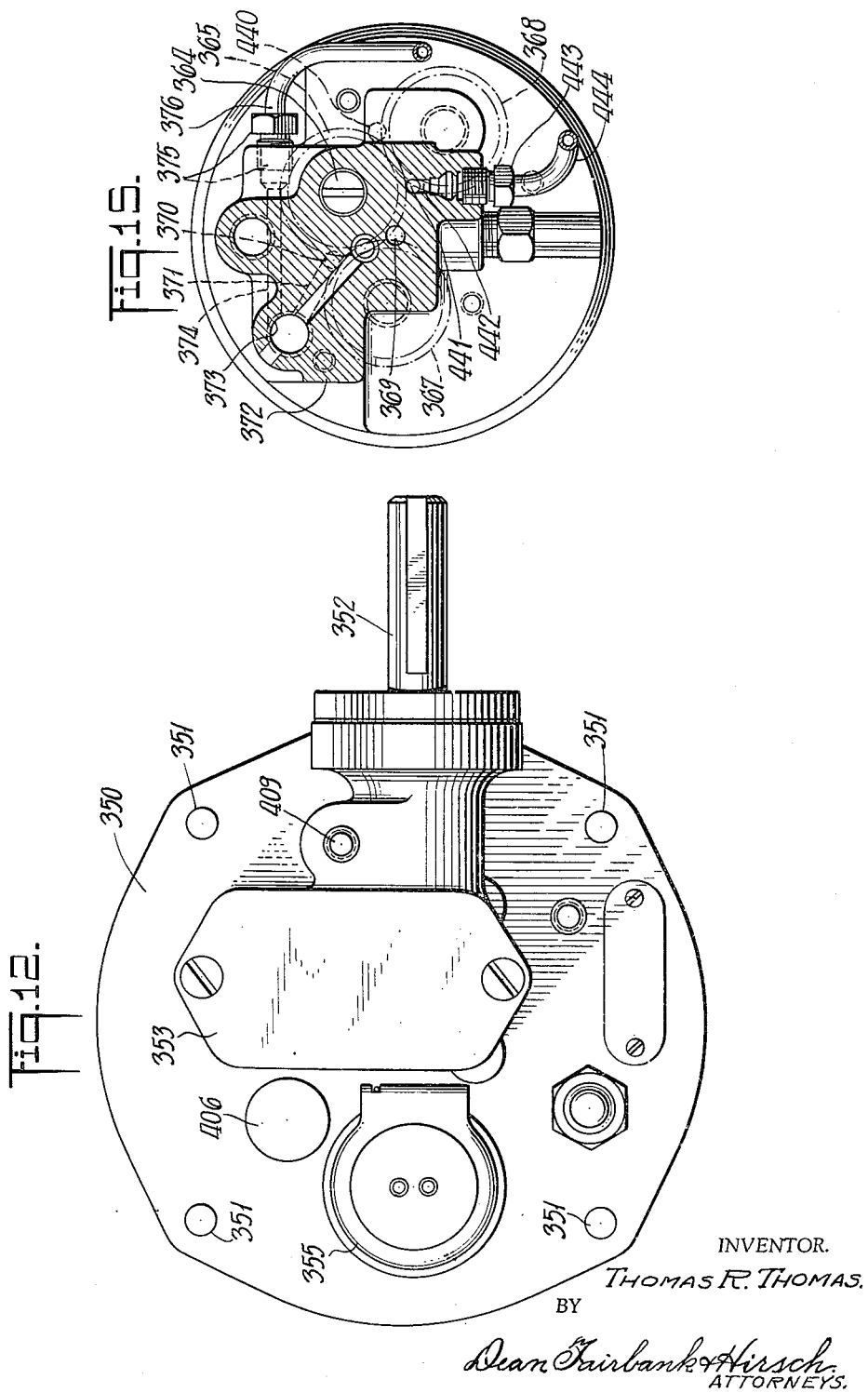

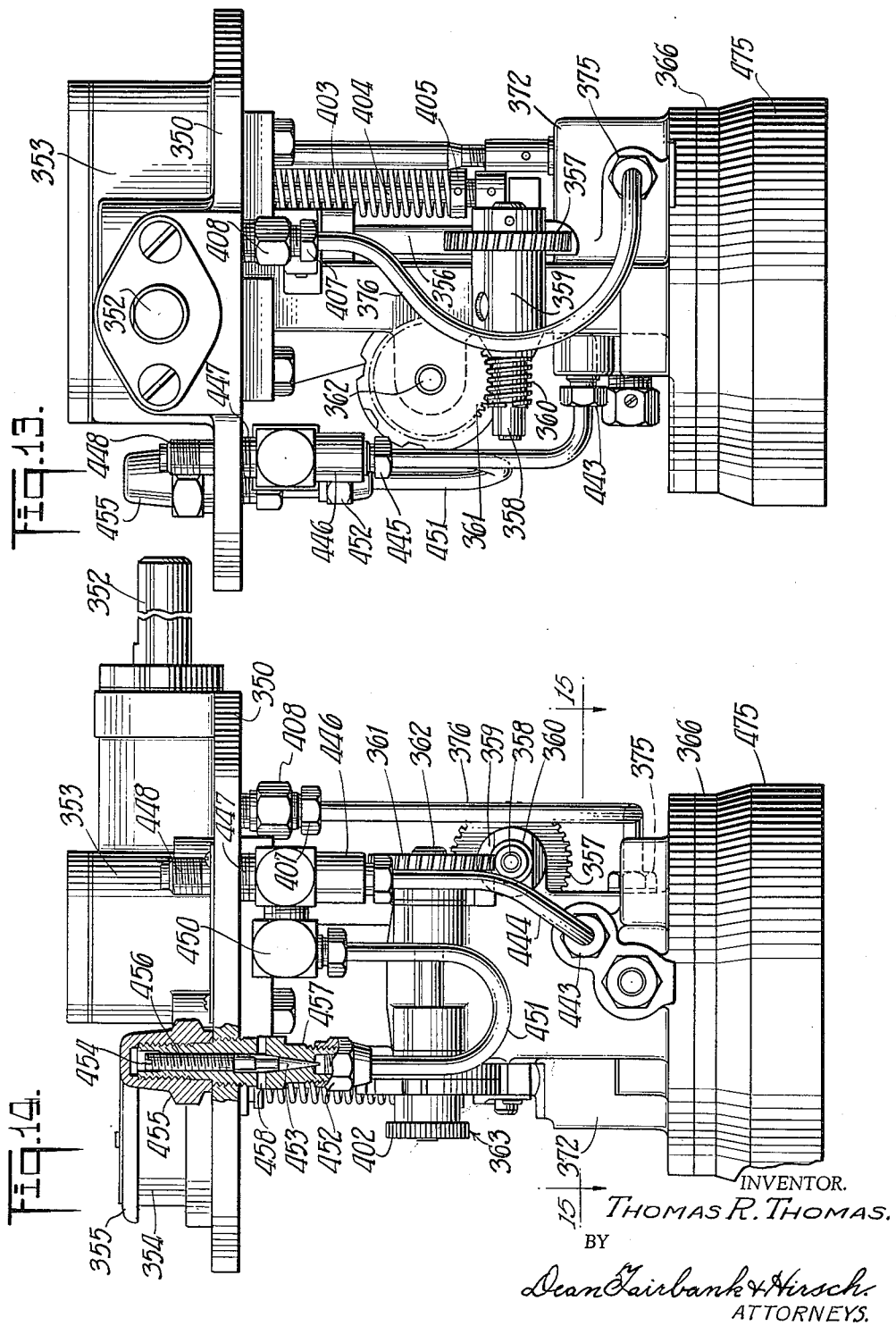

April 16, 1963
T. R. THOMAS
3,085,653
LUBRICATION SYSTEM
Filed July 27, 1959
7 Sheets-Sheet 7
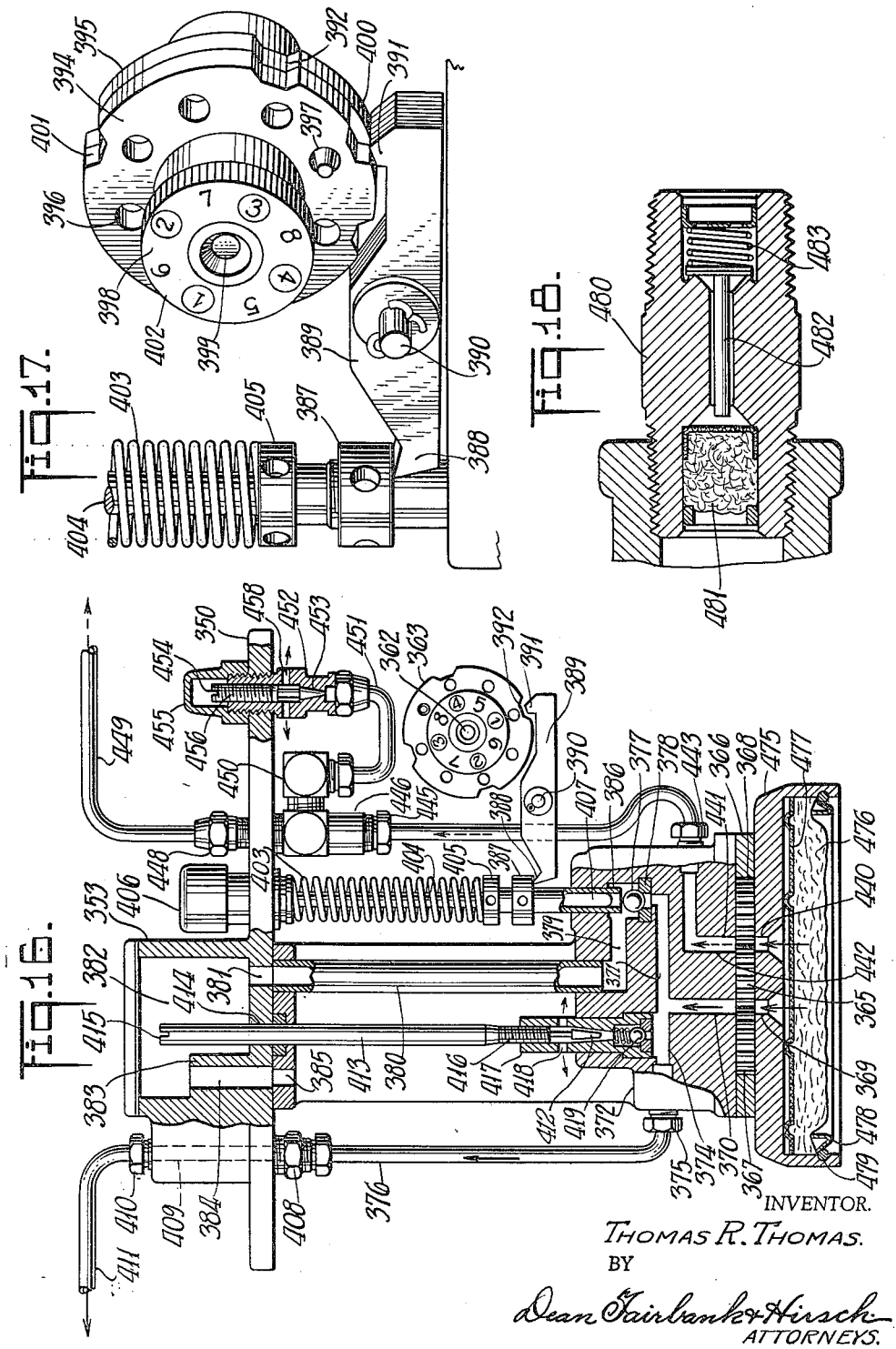
INVENTOR.
THOMAS R. THOMAS.
BY
Dean, Fairbank & Hirsch
ATTORNEYS.

United States Patent Office 3,085,653
Patented Apr. 16, 1963

1

3,085,653
LUBRICATION SYSTEM
Thomas R. Thomas, New York, N.Y., assignor to Auto Research Corporation, Dover Green, Del., a corporation of Delaware
Filed July 27, 1959, Ser. No. 829,697
3 Claims. (Cl. 184—7)

The present invention relates to a duplex gear pump and it particularly relates to a duplex gear pump which may be associated with a mechanism having various bearings requiring different types of lubrication.

It is among the objects of the present invention to provide a novel lubricating installation and particularly a lubricant pressure source which will supply predetermined quantities of lubricant to a branch distributing system leading to a large variety of bearings to be lubricated, with assurance that various groups of bearings will be supplied with predetermined quantities of lubricant in accordance with their needs, either continuously or cyclically.

A further object of the present invention is to provide a lubricant distributing system and particularly a central pump source of supplying lubricant thereto which may be automatically actuated without manual intervention to regulate the supply of lubricant to various bearings so that some bearings are supplied continuously whereas other bearings are supplied cyclically at different intervals and with the further assurance that a predetermined or special supply may be achieved by manual intervention, when desired.

A still further object of the present invention is to provide a simple, compact and novel lubricant pump which although inherently continuous in operation, nevertheless will supply different groups of bearings either cyclically or continuously depending upon their needs with the further provision that manual control may be superimposed upon the normal automatic control whenever desired, said automatic control being operated in conjunction with the machine bearing requirements and in accordance with the operating cycles of the machine.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory according to one embodiment of the present invention to provide a gear pump suspended from a cover unit which may be conveniently placed upon the top of a reservoir and serve as a cover therefor while positioning the gear drive within the body of lubricant in the lower part of the reservoir.

There is a continuous drive positioned at the top of the cover which automatically actuates a number of reciprocatory valves through a series of worm and gear arrangements with the lubricant of the pump normally being recirculated to the reservoir unless the valving arrangement closes the exit lines so that the lubricant is forced to flow into an external distribution system.

Normally, there may be provided in the preferred embodiment of the present invention a continuous feed line and two or more different cyclic feed ranges.

For example, in a preferred embodiment there may be three intermeshing gears which will permit two independently regulated lubricant discharges with each of the discharges having independent cyclic time intervals and cam mechanisms.

One distributing system may be set for 6¼ and 25 minute intervals between each cyclic shot or supply of

2 lubricant and it may be also provided with a bypass valve arrangement and a low pressure continuous feed branch which operates during the period between high pressure automatic cycles.

Another branch may have a cam arrangement set for two or four hour cycle shots with the oil between shots being permitted to overflow to lubricate the gear drive arrangements and to flow back into the reservoir or oil sump after the driving arrangements have thus been lubricated.

In the preferred embodiment the rotating drive shaft of the lubricant pump is actuated directly from a rotating shaft of the machine although it may be provided with its own independent motor control so that the actuation of the pump will have a predetermined relationship to the operation of the machine. The worm and gear arrangements which are preferably provided to give the desired reduction are connected to a plurality of cam assemblies, one of which will give an interval in the order of minutes while the other would give an interval in the order of hours between high pressure shots or supplies of lubricant to a distributing system.

In the specific embodiment which is found to be particularly useful for machine lubrication one cam assembly can give settings ranging from 5 to 30 minutes while the other may give settings ranging from 1 to 6 hours with each of the cam arrangements being adjustable to permit variation of the specific settings.

Normally the lubricant will be recirculated back to the reservoir or into a low pressure branch system or to the drive bearings unless the cam permits a valve to be closed on the low pressure line. When this occurs the oil pressure will build up to a 10 to 15 lb. p.s.i. pressure, which pressure will be controlled by a loading valve.

Normally, a safety valve will protect the distributing systems against excessive pressure, for example an excess of 200 lbs. p.s.i. Manual devices may also be provided to permit the valves to close manually when desired to give optional shots of lubricant at predetermined intervals for the various systems.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:
FIGURE 1 is a top plan view of a pump construction according to the present invention showing the top of the cover which carries the pump and gearing mechanism, as well as the first worm and gear drive connection;
FIG. 2 is a transverse offset vertical sectional view taken upon the line 2—2 of FIG. 1;
FIG. 3 is a side elevational view taken from about the line 3—3 of FIG. 1;
FIG. 4 is a vertical side elevational view taken from the opposite side of the pump mechanism and from about the line 4—4 of FIG. 1;
FIG. 5 is a transverse horizontal sectional view taken from the line 5—5 of FIG. 2;
FIG. 6 is a transverse horizontal sectional view taken from the line 6—6 of FIG. 2 showing the top of the pump mechanism;
FIG. 7 is a transverse vertical offset sectional view taken upon the line 7—7 of FIG. 1;
FIG. 8 is a transverse fragmentary vertical sectional view taken upon the line 8—8 of FIG. 5;
FIG. 9 is a horizontal sectional view taken upon the line 9—9 of FIG. 2;

FIG. 10 is a transverse horizontal sectional view taken upon the line 10—10 of FIG. 2;

FIG. 11 is a side elevational view taken from the line 11—11 of FIG. 4;

FIG. 12 is a top plan view of an alternative form of pump showing the cover;

FIG. 13 is a side elevational view taken from the right side of FIG. 12;

FIG. 14 is a side elevational view taken from the bottom of FIG. 12;

FIG. 15 is a transverse horizontal sectional view taken upon the line 15—15 of FIG. 14;

FIG. 16 is a diagrammatic side sectional view illustrating the manner in which the triple gear pump feeds lubricant to the cyclic and continuous feed branches;

FIGURE 17 is a side perspective view of the notched cam control unit; and

FIGURE 18 is a longitudinal sectional view through a typical meter unit which may be used to receive the flow of lubricant and proportion it among the bearings.

Referring to FIGS. 1 to 4 there is shown a pump cover A which carries the drive shaft B which leads into the top gear box C.

The cover is provided with a continuous outlet feed for a distributing system at D, a short cycle outlet to a distributing system at E, and a long cycle outlet connection at F.

There is also provided a short cycle manual control button G and a long cycle manual control button H.

Figure 2:
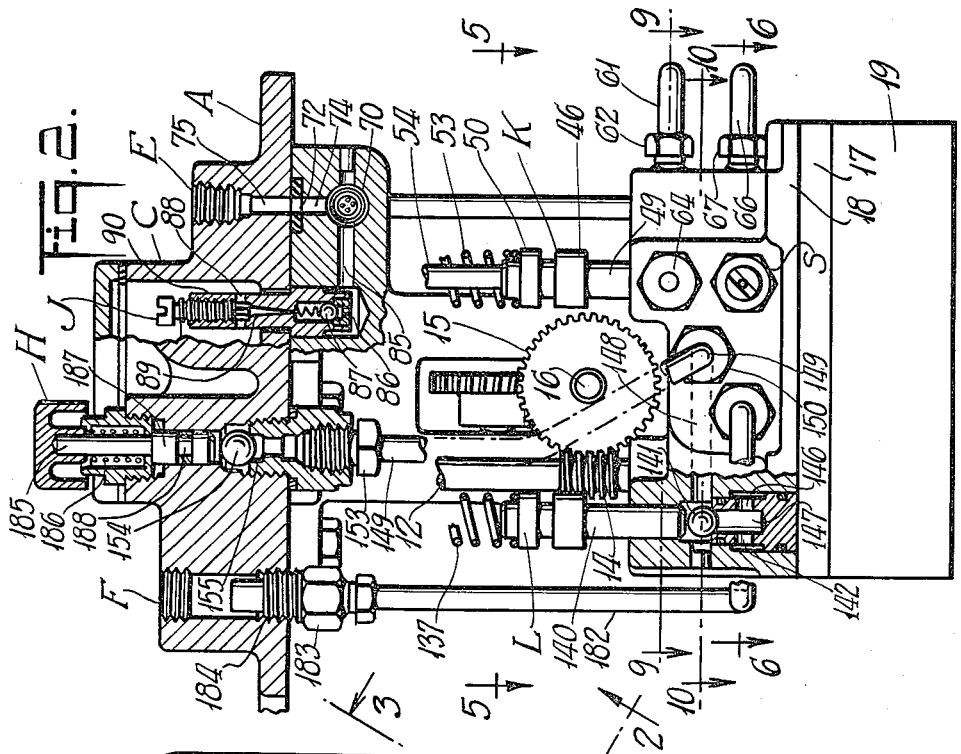

Referring to FIG. 2 there is also provided a short cycle adjustable bypass valve arrangement J and a short cycle reciprocating valve unit K associated with a long cycle reciprocating valve arrangement L.

As shown in FIG. 4 there is a long cycle control cam arrangement M and in FIG. 3 there is a short cycle cam control arrangement N.

Referring to FIG. 6 there are shown a first gear pump P on the left and a second gear pump Q on the right each with a safety valve R for the first gear pump and S for the second gear pump. These gear pumps have a common intermediate gear T and the gear pump on the left of FIG. 6 will feed the cyclic feed line having an hourly period of say 2–4 hours while the gear pump on the right will feed the cyclic feed line having a period varying from about 6 minutes to 25 minutes. The inlet of the left hand gear pump is at U while its outlet is at V.

On the other hand the inlet of the right hand gear pump of FIG. 6 is at W while the outlet is at X.

Figure 1:
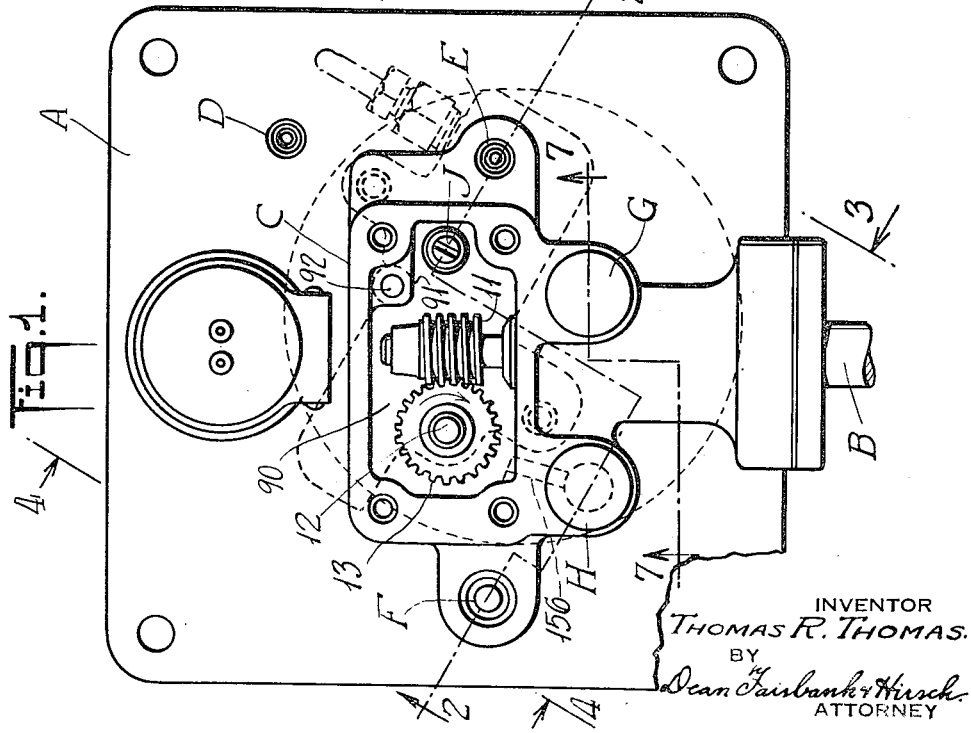

Referring to FIGS. 1 and 2 the drive shaft B as shown in FIGS. 1 and 3 will extend through the enlargement 10 upon the top of the cover as shown in FIG. 7 and will terminate in the enclosure C as indicated in FIG. 1 where it carries the worm 11.

The shaft B may be driven from a rotating shaft of the machine to be lubricated or by an independent motor and the shaft B will always be driven so that the shaft 12 will turn in a clockwise direction as viewed in FIG. 1 and at about 100 r.p.m.

The worm 11 will drive the vertical shaft 12 through the gear 13.

The shaft 12 extends downwardly through the cover and drives the worm 14 (see FIGS. 2 and 5) which meshes with the gear 15 on the horizontal shaft 16.

The vertical shaft 12 extends beyond the worm 14 to drive the pump gears P, Q and T.

As shown in FIG. 6 the gears P and Q will turn clockwise while the intermediate gear T will turn counterclockwise.

The gears P, Q and T are mounted in the plate 17 (see FIGS. 2, 3 and 4) which in turn is mounted on the bottom of the body member 18 and on top of the filter and inlet unit 19.

The shaft 16 as shown in FIG. 5 extends across the mechanism and drives the worm 25 (see FIG. 11) which in turn meshes with the upper gear 26 and the lower gear 27 (see FIGS. 5 and 11).

The gear 26 is mounted on the shaft 28 by the collar 29 and the set screw or pin 30. The shaft 28 has bearings at 31 and 32 in the arms 33 and 34 forming part of the depending body structure of the pump.

The shaft 28 in turn drives the cam assembly M which has the hourly intervals and the cam assembly N which has the minute intervals (see FIG. 5).

Referring to the cam assembly N, as shown in FIGS. 3 and 5, which controls the 6¼ to 25 minute interval cyclic system, there is provided a back member 35 fixed to the shaft 28 which has an adjustable front member 36 with a knob 37 having eight setting positions as indicated with corresponding notches 38 on the edge of the front member 36 which may match or mis-match corresponding notches in the rear member 35.

The knob 37 may be drawn outwardly in the direction 39 (see FIG. 5) against the spring 40 and then turned to adjust its position and the notch or notches which are to be operative for controlling the short cycle minute periods.

The spring 40 will normally bias the two members 35 and 36 together in latched-together position so that they can not turn relative to one another.

The actuating cam follower member 41 has a bearing on the shaft 42 and its nose 43 at the right hand end when received in a notch as indicated in FIG. 3 will permit the pressure application to take place at the desired interval. However, when the nose 43 rides upon the circumference 44 no pressure application will occur at the short cyclic feed outlet E.

The lever 41 has an opposite actuating end 45 which rides under the collar 46 (see FIG. 3) on the short cycle valve unit K. This short cycle valving unit K is best shown in FIG. 8 and the collar 46 has the openings 47 which permit it to be staked to the threaded portion 48 of the sleeve 49 (see FIG. 8).

This sleeve 49 at its upper end has an enlargement 50 forming a seat at 51 for the lower end 52 of the coil spring 53 which encircles the rod 54.

The lower end of the sleeve receives the presser member 55 which has an enlargement at tis lower end 56 cooperating with the ball check 57. When the spring 53 presses the ball check 57 against the annular seat 58 the lubricant can not flow from the chamber 59 into the bore 60 and into the tubing 61.

Where the button or valve presser member 55 is lifted from the ball 57 and permitted to float up away from the valve seat 58, the lubricant will flow through the bore 60 and into the tube or piping 61.

The piping 61 is connected to the bore 60 by the compression coupling connection 62. The tubing 61 extends upwardly as best shown in FIG. 3 to the fitting 63 screwed into the cover A which in turn is connected to the low pressure outlet connection D.

In this low pressure outlet connection D the lubricant pressure may build up at a predetermined pressure to about 10 to 15 lbs. p.s.i. with any excess of oil being fed back into the reservoir past the loading valve 64 (see FIGS. 2 and 10).

At this stage of operation no oil can flow through the cyclic line because the outlet check valve 65 (see FIG. 3) has an opening pressure which is at least 20 pounds higher than the 10 to 15 pounds in the low pressure line 61.

The outlet check valve 65 is connected to the piping or tubing 66 which in turn is connected by the compression coupling connection 67 to the chamber 59 (see FIG. 6).

The chamber 59 receives lubricant discharged from the gears T and Q of FIG. 6.

The outlet check valve 65, as shown in FIG. 3, is threaded into the tapped opening 68 and its end 69 projects into the recess 70 in the body portion 71 projecting downwardly from the cover A and sealed by means of the annular gasket 72 (see FIG. 3).

When one of the notches 38 of the cam 36 lines up with the cam follower nose 43 of the lever 41 the spring 53 pressing on the shoulder or collar 50 (see FIG. 8) will cause the button 55 to press down on the ball check 57 and seat it firmly against the annular seat 58.

When this occurs instead of the lubricant being discharged between the gears T and Q into the chamber 59, lifting up the ball and flowing through the bore 60 into the passageway 61, the flow instead will take place under the higher pressure from the chamber 59 (see FIG. 8) into the bore 73 and into the pipe or tubing 66 to the outlet spring seated valve 65 (see FIG. 3).

The outlet spring seated valve 65 will permit lubricant to flow then into the recess 70 and from the recess 70 it flows through the bore 74 to the passageway 75 (see FIG. 2) to the outlet connection E which connects to the cyclic system of the machine, requiring a 60 minute and 25 minute cyclic feed.

The safety valve S (see FIG. 6) which is connected to the chamber 59 will relieve pressure in such chamber if pressures are created in excess of 20 lbs. p.s.i. and will permit flowback to the reservoir.

Referring to FIG. 2 it will be noted that there is a side branch 85 from the recess or chamber 70 which leads to the recess 86 (see FIG. 2).

This chamber 86 receives the bypass valve J which has a spring seated ball check 87 and an adjustment needle valve 88. By turning the needle valve J counterclockwise a bypass of a portion of the oil flowing into the chamber or recess 70 may pass through the transverse bore 89 and into the chamber 90 within the gear enclosure C. Here it will lubricate the gearing 11—12 (see FIG. 1) and it will then overflow when it reaches the level of the shelf 91 through the bore 92 back into the reservoir and flow over the associated gearing below the reservoir.

This adjustment J permits setting of the pressure of the oil delivery through the bore 75 in the outlet E.

In addition to the control of the oil flow accomplished by the cam N of FIG. 3, a manual control is provided by the press button arrangement G. As shown in FIG. 7 the press button G is connected to a downwardly depending shaft 54 which extends down through the cup 94 screwed into the tapped socket 95 (see FIG. 7).

The coil spring 96 tends to press the button G upwards. The shaft passes downwardly through the bore 97 and into the recess 98 and through the insert 99 and and the cup 100.

The cup 100 acts to hold the upper end of the spring 53.

The lower end of the rod 54 fits loosely at 93 into sleeve 49 (see FIG. 8).

When the button G is depressed by hand against the spring 96 shaft 54 normally will slide downwardly through the sleeve 49 and will press the button 55 downwardly against the ball check, seating it on the valve 48 and forcing flow outwardly through the tubing 66 to the cyclic outlet E. This will give the same effect as if the spring 53 pressed the sleeve 49 downwardly causing the button 55 to seat the ball check 57.

As soon as the nose 43 of the cam arrangement N is forced back upon the outer periphery 36 due to movement of one of the notches 38, the ball check 57 will be unseated and the flow will then take place through the low pressure line 61. Thus the ball check arrangement 57 will permit alternate feed of lubricant either through the low pressure branch or outlet connection D or through the high pressure branch or outlet connection E (see FIGS. 1 and 2).

On the opposite side of the pump, referring to the cam assembly M shown in FIG. 4, the forward cam element 110 and the rearward cam element 111 may be reset in respect to one another so as to give four different settings by causing the notches to align or conform with one another as indicated at 112 in FIG. 4.

The cam structure M also has a lower cam element 113 with a single notch 114 which is mounted upon the shaft 115 carrying the gear 27 (see also FIGS. 3 and 11).

The gear 27 is driven by means of the worm 25 on the shaft 16.

The cam follower lever 116 is mounted on the shaft 117 as shown best in FIG. 4 and it has two nose portions, 118 to cooperate with the notch 112 in the upper cam structure 110—111 and another nose 119 to cooperate with the nose 114 in the cam structure 113.

It is apparent that the noses 118 and 119 will ride on the periphery of the cams 110—111 and 113 unless both notches 112 and 114 come opposite to and match the nose portions 118 and 119 in which case the lever will assume the position as shown in FIG. 4.

Referring to FIG. 10 it will be noted that the gear 27 is held in position by the collar 120 and the pin 121 and that the shaft 115 has bearings at 122 and 123 in the body extensions 124 and 125 which encloses the gear 27.

One end of the shaft 115 is held in position by the collar 126 and the pin 127 while the other end of the shaft 115 carries the single notch cam 113 (see FIG. 10).

This single notch cam 113 after proper synchronization with the cam notch 112 may be fixed in adjusted position on the shaft 115 by a nut and lock washer.

The right hand end 135 of the lever 116 rides under the collar 136 (see FIG. 4). The valve arrangement L (see FIGS. 2 and 4) is provided with a spring 137 which contacts the nipple or stud 138 depending from the cover A at its upper end and the upper collar member 139 mounted on the upper end of the shaft 140 (see FIGS. 2 and 4). When the noses 118 and 119 ride on the top edge of the cams 110—111 and 113 the lever 135 will lift the rod or shaft 140 against the spring 137. When this occurs the ball check 141 will be permitted to lift from the seat 142 (see FIG. 2).

The construction of the collar 139, the collar 136 and the sleeve or rod 140 may be the same as set forth and described in FIG. 8 and the ball check 141 may function in the same manner as the ball check 57 of FIG. 8.

When the collar 130 is elevated so that the ball check 141 may be lifted off its seat, which occurs when either nose 118 or 119 of FIG. 4 are riding on the periphery of the cams 110—111 or 113, the lubricant discharged from the outlet V of the gears P and T of FIG. 6 will flow through the bore 143, the passageway 144 (see FIG. 6), the bore 145, the transverse bore 146 (see FIG. 2), the axial bore 147 and around the ball check 141 into the passageway 148 and thence into the tubing 149 which is held in position by the compression coupling connection 150.

There is a connecting bore 151 (see FIG. 9) connecting the outlet recess 152 and the bore 148.

The bore 151 leads into the recess 152 which receives the compression coupling connection 150 (see FIG. 9).

The outlet tubing 149 connects to the compression coupling connection 153 which leads to the ball check 154 having a seat 155. The lubricant will flow past the ball check 154 into the passageway 156 (see FIG. 1) where the oil will spill into the chamber 90 within the enclosure C until it overflows the shelf 91 and down through the opening 92. This overflow hole will, as stated before, permit the lubricant to flow to lubricate the drive shaft B and the various gearing 11—13, 14—15, 25—26—27 and the various bearings of the shaft 28 of FIG. 5 and 115 of FIG. 10.

On the other hand when the nose portions 118 and 119 come opposite the recesses 112 and 114 of the cams 110—111 and 113 of FIG. 4 the element 140 will be lowered to seat the ball 141 against the seat 142 under the pressure of the spring 137. At this time the lubricant from the outlet V of the pump gears P and T will flow into the passageway or bore 180 (see FIG. 6) and thence past the compression coupling connection 181 into the tube 182 which tube 182 leads to the check valve unit 183 mounted in the top recess 184 in the bottom of the cover A.

At the tapped opening or threaded opening F suitable connection may be made to the cyclic feed line for a two-hour and a four-hour cycle. If it is desired to cause additional feed to this slow cyclic feed line the pressure button H may be employed.

This pressure button H carries the shaft 185 and it is normally biased upwardly by the coil spring 186.

The shaft 185 carries the collar 187 which has an intermediate ridge 188 receiving a rubber ring element to give a sealing effect. When the button H is forced down the ball check 154 will be pressed down against the seat 155 closing off the outlet connection 149 and forcing the lubricant to flow into the tubing 182 and out through the outlet F. A safety valve R (see FIG. 6) will protect the system in case the pressure exceeds 200 lbs p.s.i.

It will be noted that the safety valve connects to the passages 143 and 144 through the branch connection 189. This two or 4 hour cyclic outlet connection F is controlled by the different speeds of the two cams 110—111 and 113 of FIG. 4 with, for example, the cam 110—111 having nine revolutions for each ten revolutions of the came 113.

In such operation the notch 114 of the cam 113 will be opposite the cam follower nose 119 after either four and a half or nine revolutions of the cam 110—111.

At all other times the cams 110—111 and 113 will lift the follower member or pusher member 140 so that it permits the ball check 141 of FIG. 2 to permit bypassage of lubricant.

It is thus apparent that the present applicant has provided a single pump which permits a continuous feed through the outlet D, a short interval cyclic operation through the outlet E and a long interval cyclic operation through the outlet F.

Lubricant will not flow into either outlet E or outlet F so long as the ball checks 57 and 141 are permitted to be forced off their seats by elevation of the sleeves 49 and 140, respectively of the levers 41 and 116.

It will be noted that the cams M and N are mounted on a single shaft 28 as indicated in FIG. 5 and each consist of two notched cam elements 110 and 111 for cam M and 35 and 36 for cam N.

In cam M the discs or notched elements 110 and 111 may be changed in position by drawing outwardly in the direction 239 upon the knurled knob 237 against the spring 240 which will permit an adjustment of the relative position and location of the coinciding notch 112 of FIG. 4.

Normally when there is no feed past the check valve 67 to the short cyclic outlet E there will be a continuous feed through the outlet D. However, with the long cyclic outlet F the continuous feed will be back into the reservoir. The safety valves R and S will prevent excessive pressure from being developed and for example will limit the total pressure to 200 lbs. p.s.i.

Normally, the check valve units 65 and 183 will not function unless the ball checks 57 and 141 are held down by the springs 53 and 137.

The pump structure that is the feed to both gear combinations P—Q—T of FIG. 6 will be protected by a filter similar to the filter 476 in FIG. 16 having a backing screen similar to the backing screen 477 in FIG. 16 and a backing support.

The filter is held securely in place by a clamp ring similar to the retainer 478 in FIG. 16 and a snap ring similar to the snap ring 479 in FIG. 16.

In the alternative embodiment of FIGS. 12–16 there is provided a cyclic flow branch together with a continuous flow branch with the continuous flow branch having a separate bypass valve for supplementary regulation of the continuous flow.

The embodiment of FIGS. 12–16 provides a constant volume pump supplying oil to the machine bearing which require lubricant continuously within which branch the flow or volume supplied will remain comparatively contant and independent of oil pressure and temperature with the amount of oil being supplied to each bearing being regulated by a meter unit positioned at or adjacent to the bearing.

The other branch will be cyclic in operation giving discharges of lubricant under pressure of intervals of 4 minutes, 6¼ minutes, 25 minutes, 35 minutes, 75 minutes, 112½ minutes, 225 minutes or 350 minutes, depending upon the arrangement of the cams and the type of gearing.

Referring to FIGS. 12 to 16 there is provided a pump cover 350 having the openings 351 to enable bolts to mount the cover 350 upon the top of the reservoir.

This cover carries the drive shaft 352 which extends into the housing 353 the internal construction of which may be as already shown and described in connection with the housing C of FIG. 1.

The cover 350 also carries the filler opening 354 having the hinge cap 355. The vertical drive shaft 356 will be provided with a worm (not shown) to drive the gear 357 mounted on the shaft 358.

The shaft 358 extends through the bearing structure 359 as is illustrated in FIG. 13.

The shaft 356 will continue downwardly to mesh with the fillister slotted stud 364 which drives the center gear 365 (see FIG. 15).

The central gear 365 is held in the plate 366 of FIGS. 13 and 14 and it meshes with and drives the other pump gears 367 and 368 (see FIG. 15). The gears 367 and 365 will form a pump unit for the cyclic feed whereas the gears 365 and 368 will form the pump unit for a continuous feed.

The cyclic pump unit 365—367 as best shown in FIGS. 15 and 16 has an inlet port 369 and an outlet port 370. The outlet port 370 feeds the transverse bore 371 in the base structure 372.

As shown in FIG. 15, the bore 371 feeds lubricant into the chamber 373 from which chamber 373 it flows through the bore 374 to the outlet connection 375 and into the tube 376.

In the diagrammatic showing of FIG. 16 the transverse bores 371 and 374 are shown in different position and it will be noted that associated with these bores there is positioned the check valve 377 provided with the valve seat 378.

The check valve 377 (referring to FIG. 16) when open will permit flow of lubricant into the passage 379 and then upwardly through the tube 380 into the bore 381 and into the chamber 382 in the housing 353.

A lubricant will fill the chamber 382 to the level of the shelf 383 and it will overflow through the vertical bore 384 down through the cover 385 and flow over the gearing and internal mechanism as is also true in connection with the shelf 91 and the bore 92 in the first embodiment of FIG. 1.

The valve 377 at intervals when a shot is to be applied through the tube 376 is seated by means of the sleeve 386 (see FIG. 16).

This sleeve has a collar 387 which is normally lifted by the nose 388 of the cam follower lever 389 pivotally mounted at 390.

This cam follower lever 389 at its right hand end is provided with a nose 391 which cooperates with the recesses 392 in the notched cam structure 363 which in turn is driven by the shaft 362.

The cam arrangement 363 is best shown in the perspective view of FIG. 17.

It will be noted that there is a front notched disc 394 and a rear notched disc 395. The front disc has a series of openings 396 which are designed to receive the forwardly projecting stud 397 from the rear disc 395 at a desired position.

The front disc has a knurled projection knob 398 which slides on the center stud or shaft 399 and normally is spring pressed or biased so that the engagement of the stud 397 with one of the openings 396 will determine the notched positions.

It will be noted that at position 392 the two notches on the front disc 394 and the rear disc 395 coincide so that the nose 391 can descend into the notch and the sleeve 386 can move downwardly seating the ball check 377 of FIG. 16 against the valve seat 378. This will cause a high pressure shot of lubricant to flow outward through the tube 376.

On the other hand at a position 400 of FIG. 17 where the notches do not coincide the nose 391 will ride upon the outer periphery of one of the other discs.

There is another position 401 indicated in FIG. 17 where the notches coincide and here again the nose 391 will descend, permitting the sleeve 386 to seat the ball check 377.

It will be noted that the handle member 398 has eight indicated positions at 402 which can give various timings of the cycle and various discharges per cycle, varying from 4 minutes up to as long as 350 minutes.

The sleeve 386 is normally biased downwardly toward the check valve 377 when not held up by the lever 389 by the spring 403 which encircles the rod 404 and presses on the collar 405. The manual button 406 when pressed downwardly will force the rod 404 down and will cause the lower end 407 of the rod to press down the check valve 377 and give an instantaneous shot of lubricant through the line 376.

The line 376 as shown in FIGS. 13 and 16 leads upwardly to a coupling connection 408 at the bottom of the cover and it is connected by a bore 409 to the outlet connection 410 and to a cyclic branch 411 to the meter units located at the bearings to be lubricated.

Referring to FIG. 16, there is provided an adjustable needle valve 412 associated with the flow passages 370, 371 and 374 which regulates the flow of lubricant through the outflow passage 376. This bypass needle valve adjustment 412 functions in the same manner as the adjustment J in FIG. 2.

Referring to FIG. 16, the needle valve 412 is provided with a vertical shaft 413 which projects upwardly through the cover at 414 and has a fillister slotted head 415 in the chamber 382.

The lower end of the rod 413 is threaded at 416 in the sleeve 417 which sleeve has transverse flow passages 418.

As the needle valve 412 is screwed downwardly less lubricant is relieved from the passages 371 and 374 whereas when the needle valve is screwed upwardly more lubricant will be released. Before the needle valve is positioned a spring seated ball check valve 419.

The continuous flow arises from the operation of the gear pump unit 365—368.

The gear pump unit 365—368 of FIG. 15 has an inlet port 440 (see FIG. 15) and an outlet port 441 which ports are also diagrammatically shown in FIG. 16.

The lubricant flows from the outlet port 441 through the bore system 442 through the coupling connection 443 into the upwardly extending tube 444.

The external tubing 444 leads upwardly to the tubing connection 445 connected to the bypass junction unit 446.

This bypass junction unit as diagrammatically shown at FIG. 16 and as also shown in FIGS. 14 and 15 has one connection at 447 extending through the cover 350 to the outlet tubing connection 448 and to the cyclic branch 449 leading to meter units associated with bearings to be fed with lubricant continuously.

The bypass connection takes place through the junction element 450 (see FIGS. 14 and 16) which is connected by a U-shaped tube 451 to the adjustable needle valve unit 452. The adjustable needle valve unit 452 has the tapered needle valve 453 with a threaded shank 456 permitting upwardly or downwardly adjustment by means of a fillister slot normally covered by the cap 455.

The needle valve unit has a body 457 with the transverse flow passages 458 which will permit a greater or lesser amount of lubricant to be released from the continuous branch system 444—449.

The filter unit is best shown diagrammatically in FIG. 16 and it is formed in the inverted member 475 (see FIGS. 12, 13 and 16).

The inverted coupling member as is best shown in FIG. 16 receives the filter pad 476 with the screen backing 477. The periphery of the pad 476 is held in position by the retainer 478 held in position by the snap ring 479.

Referring to the unit of FIGS. 12 to 16 it is apparent that the three gears driven simultaneously will supply lubricant through the system 376—411 for a cyclic system and through the conductors 444—449 to a continuous system. The cyclic system 376—411 is controlled by the adjustment of the cam discs 394—395 of FIG. 17 so as to cause lubrication of the cam follower lever 389 to lower the sleeve 386 and seat the check valve 377.

The flow through the continuous flow branch 444—449 may be controlled by the needle valve arrangement 452 while the flow through the cyclic branch 376—411 may be controlled by the needle valve 412. This lubricator installation will thus give a feed to bearings which require continuously fed lubricant as well as to bearings requiring a cyclic feed with the pump being automatically lubricated by the bypassage of lubricant through the passageways and conduits 380—384 as shown in FIG. 16.

Each bearing may be supplied with a meter unit 480 having an inlet strainer 481 a center pin-restricting bore 482 and an outlet spring seated check valve 483. The restricting effect of the pin 482 is so much greater than the friction encountered in the bores or in the piping or in the bearings that such restricting effect will predominantly control the flow of lubricant through the lubricating system.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A central lubricating installation comprising a reservoir and a pump to supply lubricant substantially continuously to a continuous lubricant distribution system, intermittently at short intervals to a short cycle lubricant distribution system and intermittently at long intervals to a long cycle lubricant distribution system, said installation having a cover with a top side and an underside, said cover serving as a closure for said reservoir, a structure depending from said underside and extending into said reservoir, said cover having a continuous feed outlet in communication with said continuous lubricant distribution system, a short cycle feed outlet in communication with said short cycle lubricant distribution system and a long cycle feed outlet in communication with said long cycle lubricant distribution system, said structure having a first gear, a second gear and a common intermediate gear, means to rotate said common intermediate gear, said first and second gears intermeshing with said common intermediate gear to form two pump means, each pump means having an inlet side and an outlet side, the inlet side of each pump means being in communication with said reservoir, a first conduit connecting the outlet side of one of said pump means with said continuous feed outlet, a second conduit connecting the outlet side of said one pump means with said short cycle feed outlet, a first valve means in said first conduit, said first valve means having an opened and a closed position, lubricant flowing through said first conduit to said continuous feed outlet when said first valve means is in said opened position, and lubricant flowing through said second conduit to said short cycle feed outlet when said first valve means is in said closed position, a first cam and cam follower means operatively connected to said first valve means to move said first valve means from its opened position to its closed position at predetermined short intervals, and a first manually operated push button and follower means operatively connected to said first valve means to manually move said first valve means from its opened position to its closed position, a third conduit connecting the outlet side of the other of said pump means to a bypass chamber in said cover, an overflow passageway connecting said bypass chamber to said reservoir at a point above said structure, a fourth conduit connecting said outlet side of said other pump means to said long cycle feed outlet, a second valve means in said third conduit, said second valve means having an opened and a closed position, lubricant flowing through said third conduit to said bypass chamber and then through said overflow passageway to flow over said structure back to said reservoir when said second valve means is in said opened position, and lubricant flowing through said fourth conduit to said long cycle outlet when said second valve means is in said closed position, a second cam and cam follower means, said second cam and cam follower means comprising two separate cams each having a cam surface and a pivotally mounted lever having two ends, one end of said lever having an actuating means in operative engagement with said second valve means to move said second valve means from its opened to its closed position at predetermined long intervals, and the other end of said lever having bifurcated arms, each arm having a cam follower end in contact with one of said cam surfaces on said two separate cams, and a second manually operated push button and follower means operatively connected to said second valve means to manually move said second valve means from its opened position to its closed position.

2. The installation in accordance with claim 1, wherein each of said pump means has a safety valve arrangement on its outlet side, each of said safety valve arrangements including a passageway communicating with said reservoir and a spring seat check valve in said passageway to permit lubricant to flow back into said reservoir when a predetermined pressure has been exceeded.

3. The installation in accordance with claim 1, comprising further a bypass passageway connecting said second conduit to said bypass chamber, a needle valve in said bypass passageway between said second conduit and said bypass chamber, means to adjust said needle valve, whereby the pressure of the lubricant delivered to said short cycle lubricant distribution system may be varied and a portion of the lubricant flowing through said second conduit to said short cycle feed outlet may be bypassed through said bypass chamber and said overflow passageway to flow over said structure back to said reservoir.

References Cited in the file of this patent

UNITED STATES PATENTS

| | | |
|---|---|---|
| 974,783 | Frederick | Nov. 8, 1910 |
| 1,384,873 | Strickland | July 19, 1921 |
| 2,145,245 | Bijur | Jan. 31, 1939 |
| 2,278,452 | Kocher | Apr. 7, 1942 |
| 2,580,953 | Pierce | Jan. 1, 1952 |
| 2,787,336 | Thomas | Apr. 2, 1957 |